United States Patent
Bal

(10) Patent No.: US 6,581,444 B2
(45) Date of Patent: Jun. 24, 2003

(54) WHEEL BALANCING METHOD

(75) Inventor: Pushpinder Singh Bal, Chatsworth, CA (US)

(73) Assignee: Superior Industries International, Inc., Van Nuys, CA (US)

( * ) Notice: Subject to any disclaimer, the term of this patent is extended or adjusted under 35 U.S.C. 154(b) by 147 days.

(21) Appl. No.: 09/888,288

(22) Filed: Jun. 21, 2001

(65) Prior Publication Data

US 2002/0194913 A1 Dec. 26, 2002

(51) Int. Cl.[7] .................................................. G01M 1/00
(52) U.S. Cl. ........................................... 73/66; 301/5.21
(58) Field of Search ..................... 76/66, 460; 301/5.21

(56) References Cited

U.S. PATENT DOCUMENTS

| 304,809 A | 9/1884 | Esplin |
|---|---|---|
| 2,193,734 A | 3/1940 | MacCracken |
| 3,273,941 A | 9/1966 | Skidmore |
| 3,463,551 A | 8/1969 | Clay |
| 3,786,850 A | 1/1974 | Turoczi, Jr. |
| 3,905,648 A * | 9/1975 | Skidmore .................. 301/5.21 |
| 3,909,584 A | 9/1975 | Brienza et al. |
| 3,939,020 A | 2/1976 | Caramanian et al. |
| 4,106,964 A | 8/1978 | DeVittorio |
| 5,073,217 A | 12/1991 | Fogal |
| 5,197,633 A | 3/1993 | Hines et al. |
| 5,271,663 A | 12/1993 | Maldini et al. |
| 5,797,543 A | 8/1998 | Reed et al. |
| 5,801,951 A | 9/1998 | Burns, II et al. |
| 5,959,205 A | 9/1999 | Yamaya et al. |
| 6,024,453 A | 2/2000 | Edlinger et al. |
| 6,260,929 B1 * | 7/2001 | Oba et al. .................. 301/5.21 |
| 6,413,626 B1 * | 7/2002 | Wollner .................... 428/317.3 |

* cited by examiner

Primary Examiner—Richard A. Moller

(57) ABSTRACT

An automotive roadwheel is pre-balanced before a tire is mounted thereto. The wheel is balanced by applying a mass of ballasted adhesive to a protected surface of the wheel.

14 Claims, 2 Drawing Sheets

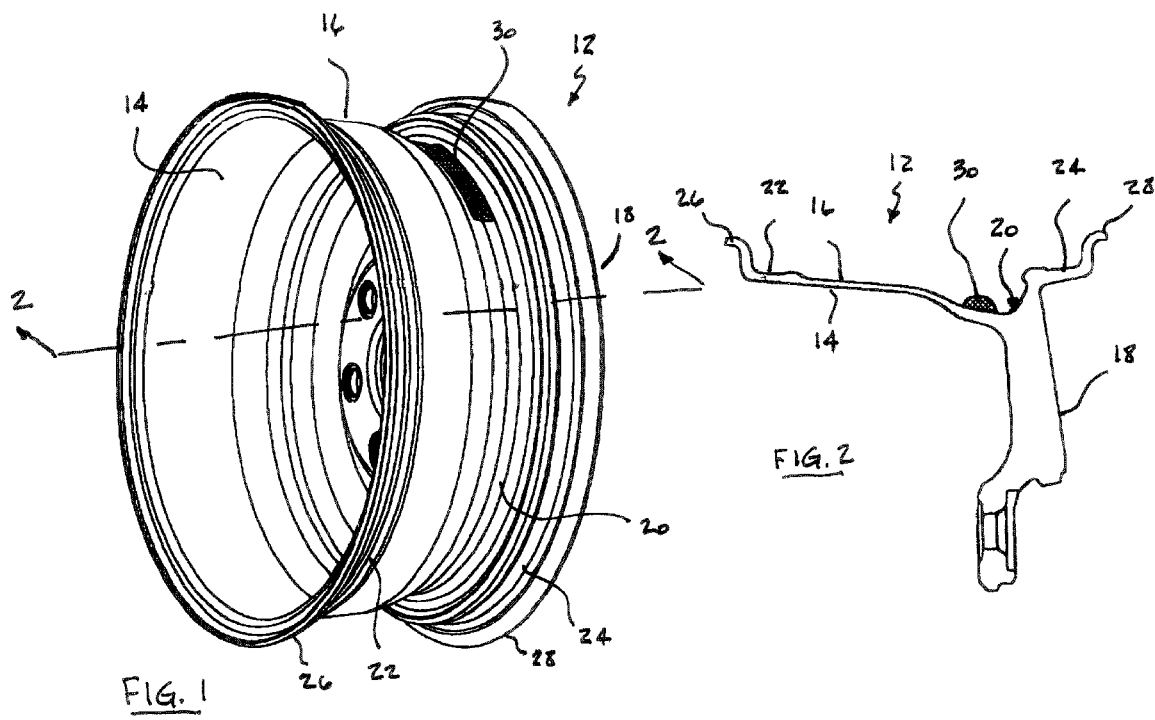
FIG. 1
FIG. 2
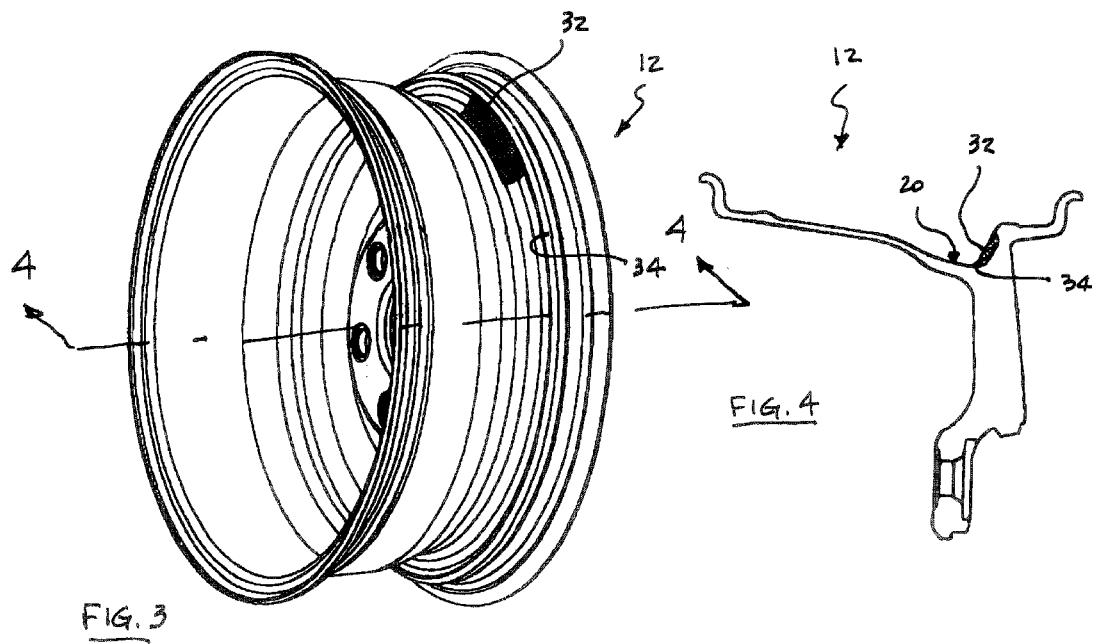
FIG. 3
FIG. 4

WHEEL BALANCING METHOD

BACKGROUND OF THE INVENTION

The present invention is directed to automotive roadwheels and more particularly pertains to a method of reducing the amount of weight that would otherwise need to be added to a wheel during the tire balancing operation.

Proper rotational balance of an automobile's tires is essential in order to provide a smooth ride, optimize handling characteristics, minimize wear and tear to the vehicle and extend the service life of the tires. A tire is normally balanced after its mounting to a wheel by the attachment of weight to the wheel. The balancing procedure typically comprises the steps of spinning the wheel and tire assembly up to speed, measuring the forces generated by any imbalances, determining the amount of weight and the precise placement of such weight necessary to counteract the measured forces and clipping or adhering weights to the wheel. In order to achieve dynamic balance it is usually necessary for balancing weights to be attached to both the inboard as well as outboard edges of the wheel. The clip-on weights are attached directly to the wheel flanges while the adhesive weights are usually attached to the curb side and brake side of the wheel immediately adjacent to the wheel's flanges. If the wheel is sufficiently offset, the weight required on the outboard edge of the wheel can sometimes be hidden by attaching it to the wheel just inboard of the wheel's center element. The assembly is then again spun up to speed to confirm that proper balance has been achieved. Occasionally, the entire balancing procedure must be repeated if a further readjustment is found to be necessary.

The source of an imbalance in a tire and wheel combination is often a combination of imbalances inherent in the tire as well as the wheel. With the trend toward the use of larger and larger wheels and tires for automotive applications, more and more balancing weight often needs to be added in order to achieve an acceptable degree of balance. Moreover, the use of larger diameter wheels in combination with lower profile tires will cause the wheel to be comprise a greater proportion of the total weight of the assembly and therefore, the wheel may be the source of a greater proportion of the total imbalance. The popularity of chrome on wheels further compounds the problem as the chroming process may add significant imbalances to a wheel.

The need to attach balancing weight during the tire balancing operation is somewhat problematic. The weights are typically made of lead which is removed and discarded with each balancing operation. Moreover, the balancing operation itself may cause some waste as a trial and error may be needed in order to achieve an acceptable degree of balance. Not only does the repeated replacement of the weights involve some cost, but the wheel's protective coating may be damaged in the process and an environmental issue is raised if the disposal or recycling of the removed weights is not properly undertaken. Additionally, the presence of balancing weights on the outboard edge of the wheel is considered rather unsightly by some.

It is therefore highly desirable to minimize the amount of weight that must be added during the tire balancing operation to bring a wheel and tire combination into balance. By reducing the amount of balancing weight that is required, a reduction of waste as well as an amelioration of the environmental concerns can be realized. Additionally, the need to attach less weight to the outboard edge of the wheel is aesthetically advantageous.

SUMMARY OF THE INVENTION

The present invention overcomes the shortcomings of previously used methods for achieving balance in a wheel/tire combination. Rather than relying on the tire balancing operation to balance all of the imbalances that may be present in the wheel as well as the tire, the present method provides for permanently achieving a predetermined degree of balance in the wheel before the tire is mounted thereto. Such predetermined degree of balance may involve reducing the wheel's inherent imbalance to within a range of from zero to an allowable limit, achieving essential a zero imbalance condition or achieving a range about target degree of imbalance. This obviates the need to, in effect, rebalance the wheel with each tire balancing operation and as a result, the amount of balancing weight that is on average needed during the tire balancing operation may be substantially reduced.

More particularly, the present invention provides for determining the imbalances that may be inherent in a wheel before a tire is mounted thereto and applying balancing weight thereto in order to achieve a preselected degree of balance. The balancing weight is preferably permanently attached to the wheel and preferably takes the form of a ballasted adhesive. Such balancing material may be applied to any surface of the wheel so as to avoid interference with any brake or suspension components and so as not to hamper the mounting and seating of the tire. Moreover, the material should be positioned in a relatively protected location so as to avoid dislodgement and should preferably be positioned so as not be visible from the curb side of the wheel. Most preferably, the balancing material is applied to the drop center in the tire side of the wheel wherein the tire will serve to not only hide the material from view but also protect it from the elements and prevent it from becoming dislodged or damaged during normal use.

The balancing process may be fully or partially automated. After determining the magnitude of the imbalance and the location at which the addition of weight would effectively compensate for the imbalance, the amount of adhesive that must be dispensed is calculated. The material is then applied directly to the wheel surface at the predetermined location in any of a variety of configurations. The ballasted adhesive formulation does not sag, sets up in a short period of time and once fully cured, forms an extremely strong and permanent bond with either an unfinished metal surface, a painted surface or a chromed surface of the wheel. Subsequently thereto, a tire is mounted to the wheel and the wheel and tire assembly may then be balanced in the conventional manner.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWINGS

FIG. 1 is perspective view showing the application of a quantity of ballasted adhesive to a roadwheel in a preferred location;

FIG. 2 is a cross-sectional view taken along lines 2—2 of FIG. 1;

FIG. 3 is a perspective view showing the application of a quantity of ballasted adhesive to another preferred location in a roadwheel;

FIG. 4 is a cross-sectional view taken along lines 4—4 of FIG. 3.

DETAILED DESCRIPTION OF THE PREFERRED EMBODIMENTS

Figure 5:
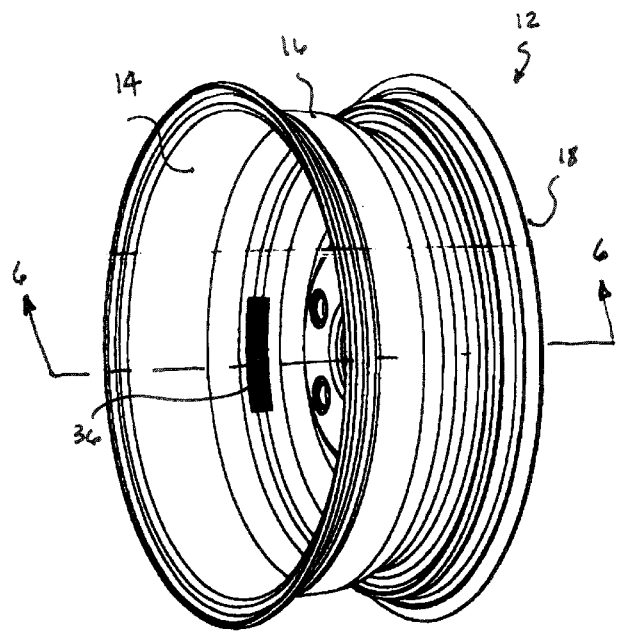
FIG. 5 is perspective view showing the application of a quantity of ballasted adhesive to a roadwheel in yet another preferred location.

The present invention provides for a method of balancing a wheel and tire combination that reduces the amount of weight that must typically be attached to the wheel with each tire balancing operation. The method first calls for the performance of a pre-balancing step wherein a preselected amount of ballasted adhesive is permanently applied to a wheel prior to the mounting of a tire thereto, and a final balancing step, wherein the entire wheel and tire assembly is brought into balance with the attachment of removable weights to the wheel. By reducing the amount of weight that must be temporarily attached with each tire balancing operation, waste is reduced and environmental concerns relating to the disposal of lead balancing weights is ameliorated.

The pre-balancing step of the method of the present invention first requires the imbalances inherent in a wheel sans tire to be quantified in terms of location and magnitude. Calculations are then made to determine how much weight is need to counterbalance such forces and where the attachment of such weight to the wheel would have the desired effect. The desired effect may consist of an acceptable range of imbalance from zero to an allowable limit, or to achieve essentially no imbalance, i.e. a "zero balance" wheel, or to achieve an acceptable range about a target degree of imbalance and may further involve achieving such degree of imbalance at a predetermined location on the wheel. The latter approach would allow a wheel's imbalance to be matched to the average imbalance of a population of tires whereby the average amount needed to bring the final wheel and tire assembly into balance is greatly reduced. Such technique requires both the wheel as well as the tire to be marked with respect to the position of the imbalance such that the heavy point of the wheel can be matched to the light section of the tire or vice versa of such balancing method is described in U.S. Pat. No. 5,271,663 which is hereby incorporated herein by reference in its entirety. Once the appropriate amount of balancing weight and the required positioning of the weight is determined in accordance with any one of such criteria, the weight is permanently applied to the wheel.

The preferred balancing material consists of a ballasted adhesive. Any of various combinations may be employed wherein a preferably dense metal in the form of powder or very small pellets is intermixed with an adhesive composition. A preferable formulation comprises powdered steel, having an average particle size of 2–10 mils, intermixed with a two component polyurethane composition. The powder is first intermixed with one of the two components while the second component of the two component adhesive combination is intermixed therewith shortly before application to the wheel. The composition is selected for its ability to adhere to unfinished metal surfaces, both as cast or machined, to painted surfaces and to chromed surfaces, to form a strong bond therewith that will remain attached to the wheel over the expected service life of the wheel despite the wide temperature fluctuations and vibrations that are routinely encountered in such application. The composition should preferably be a non-sagging formula that quickly sets up so as to allow the wheel to be handled shortly after the pre-balancing operation. A preferred composition consists of an adhesive based on an MDI isocyanate and a polyether and polybutadiene blend. The specific gravity of both the resin as well as the hardener is 3.23, the mix ratio of resin to hardener is 1:2 by volume and initial viscosity of the resulting mixture should be about 13,500 cps @ 25 C. Such material cures in about 15 minutes @ 150 F or overnight at room temperature.

While the balancing material may conceivably be applied to any surface on the wheel where interference with the brake and suspension components is avoided and where the mounting and seating of the tire would not be hampered in any way, the preferred location is on the tire side of the wheel within the drop well. FIG. 1 illustrates a road wheel 12, wherein the brake side 14, tire side 16 and curb side 18 are identified. The tire side of the wheel includes a drop well 20 that facilitates the mounting of a tire thereto, inboard 22 and outboard bead seats 24 as well as inboard 26 and outboard flanges 28. The Figure illustrates a preferred location for applying a mass of ballasted adhesive 30 to the wheel for the purpose of pre-balancing the wheel in accordance with the present invention. In such embodiment the mass has been applied to the base of the drop well. Such location not only freely allows a tire to be mounted and seated but the mounted tire then serves to protect and hide the balancing weight. FIG. 2 is a cross-sectional view of such embodiment illustrating the precise placement of the weight.

FIG. 3 illustrates an alternative embodiment wherein the mass of ballasted adhesive 32 has been applied to an annular groove 34 formed in the side of the drop well 20. Such location similarly relies on a tire that is subsequently mounted to the wheel to hide and protect the balancing weight while the mounting and seating of the tire is not hampered in any way. FIG. 4 is a cross-sectional view of such embodiment further illustrating the precise placement of the weight.

Figure 6:
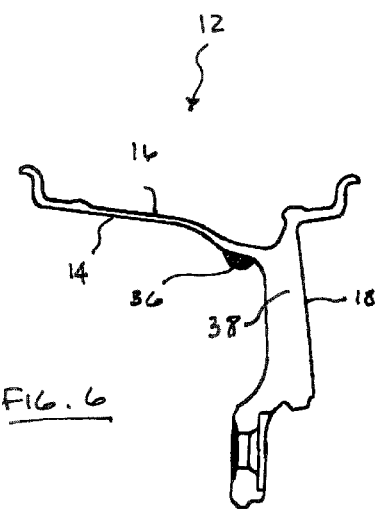
FIG. 6 is a cross-sectional view taken along lines 6—6 of FIG. 5.

FIG. 5 illustrates an alternative embodiment wherein the mass of ballasted adhesive 36 has been applied to the brake side 14 of the wheel 12. The weight is positioned as close to the wheel's central disc member 38 as possible. The central disc contains a substantial portion of the wheel's total weight and as such, is likely to be the source of most of imbalances. Aligning the counter-balancing weight with the location of an imbalance tends to reduce sources of dynamic imbalances. While the tire cannot serve to protect the balancing weight in such location, the weight is nonetheless out of sight and furthermore, is immune from fly-off as the centrifugal force generated by the wheel's rotation causes the weight to be pressed against the wheel. FIG. 6 is a cross-sectional view of such embodiment further illustrating the placement of the weight.

Figure 7:
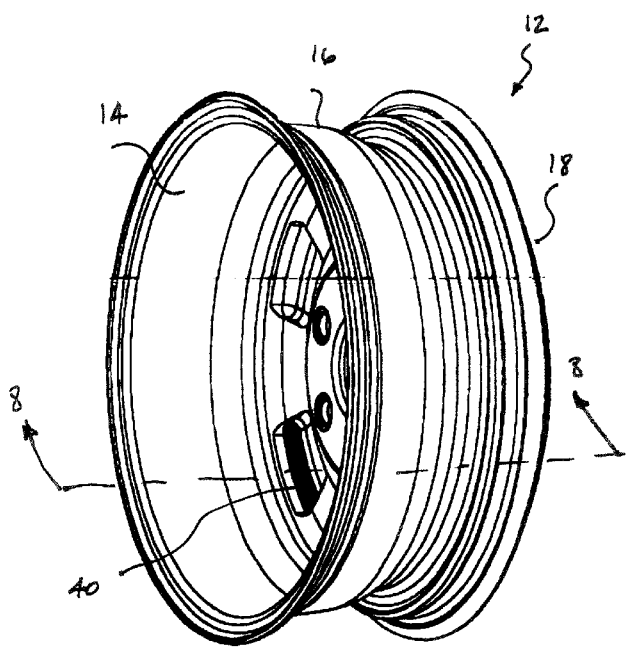
FIG. 7 is a perspective view showing the application of a quantity of ballasted adhesive to another preferred location in a roadwheel.
Figure 8:
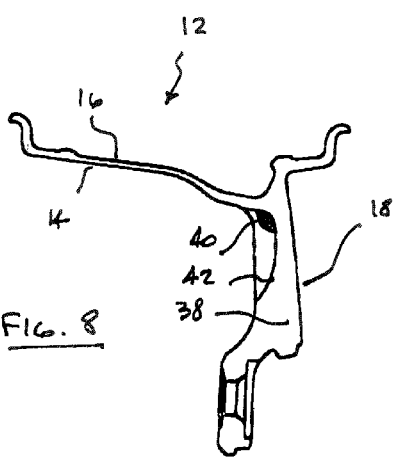
FIG. 8 is a cross-sectional view taken along lines 8—8 of FIG. 7.

FIG. 7 illustrates an alternative embodiment wherein the mass of ballasted adhesive 40 has been applied to the brake side 14 of the wheel 12. The weight is positioned within indentations 42 formed in the wheel's central disc member 38. In the event the wheel includes a central disc member having a spoked configuration, such indentations will be formed in the back of the spokes. Dividing up the weight between multiple indentations may be necessary in order to adequately compensate for any imbalance. FIG. 8 is a cross-sectional view of such embodiment further illustrating the precise placement of the weight.

The balancing process first requires the wheel to be adequately cleaned and dried. The imbalance location is then determined and marked and the amount of weight that is needed is calculated as is well known in the art. While the wheel is still in a vertical or horizontal orientation, the appropriate amount of ballasted adhesive is applied by a meter-mix-dispense machine wherein the application is accomplished either semi- or fully automatically. In the former method, an operator must bring the wheel to the appropriate position and depress a dispensing button for the appropriate length of time in order to dispense the desired amount of ballasted adhesive. In a fully automatic procedure, the balancing/dispensing device automatically positions the wheel and dispenses the appropriate amount of ballasted adhesive without any operator intervention.

The mass of ballasted adhesive may be applied in any number of different configurations including linear beads, circular dollops, or a zig zag pattern. The material may be applied in a single location to achieve static balance or in the event dynamic balance is to be achieved, the material may be applied to a plurality of locations.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A method of balancing an automotive wheel/tire combination, comprising the steps of:

determining how much a wheel is out-of-balance;

applying a ballasted adhesive material to said wheel in order to achieve a preselected degree of balance in said wheel;

mounting a tire to said wheel;

determining how much said wheel/tire combination is out-of-balance; and attaching balancing weight to said wheel.

2. The method of claim 1, wherein said preselected degree of balance comprises a range of from zero to a maximum amount of imbalance.

3. The method of claim 1, wherein said preselected degree of balance comprises "zero-balance".

4. The method of claim 1, wherein said preselected degree of balance comprises a range about a preselected amount of imbalance.

5. The method of claim 4, wherein tires for mounting on said wheel are selected from a population having an average degree of imbalance and wherein said preselected degree of imbalance in said wheel matches said average degree of imbalance in said population of tires.

6. The method of claim 5, further comprising the steps of marking said wheel with regard to the point of imbalance and mounting said tire to said wheel such that the imbalance of the wheel counterbalances said imbalance in said tire.

7. The method of claim 1, wherein said ballasted adhesive is a applied to the tire side of said wheel.

8. The method of claim 7, wherein said ballasted adhesive is applied to the wheel's drop well.

9. The method of claim 1, wherein said ballasted adhesive is applied to the brake of said wheel.

10. The method of claim 1, wherein said ballasted adhesive is applied to said wheel in a linear configuration.

11. The method of claim 1, wherein said ballasted adhesive is applied to said wheel in a circular configuration.

12. The method of claim 1, wherein said ballasted adhesive comprises a steel-containing polyurethane.

13. The method of claim 12, wherein said steel in said steel-containing urethane has a particle size of from 2 to 10 mils.

14. The method of claim 12, wherein said polyurethane comprises a two part system comprising a resin and hardener component.

* * * * *